United States Patent [19]

Hawes

[11] 4,432,201

[45] Feb. 21, 1984

[54] ACCELERATION LIMIT RESET

[75] Inventor: David J. Hawes, Pierrefonds, Canada

[73] Assignee: Aviation Electric Ltd., Montreal, Canada

[21] Appl. No.: 224,977

[22] Filed: Jan. 14, 1981

[51] Int. Cl.³ .............................. F02C 3/10; F02C 9/28
[52] U.S. Cl. ................................ 60/39.161; 60/39.281
[58] Field of Search ...................... 60/39.28 R, 39.161

[56] References Cited

U.S. PATENT DOCUMENTS

| | | |
|---|---|---|
| 3,006,144 | 10/1961 | Arnett et al. |
| 3,152,444 | 10/1964 | Peczkowski et al. |
| 3,393,691 | 7/1968 | Longstreet et al. |
| 3,587,229 | 6/1971 | Peczkowski |
| 3,832,846 | 9/1974 | Leeson |
| 3,888,078 | 6/1975 | Greune et al. |
| 3,928,962 | 12/1975 | Maker ............... 60/39.28 R |
| 3,939,649 | 2/1976 | McCabe ............ 60/39.28 R |
| 3,956,884 | 5/1976 | Eves ...................... 60/39.281 |
| 4,018,044 | 4/1977 | Joby et al. |
| 4,040,250 | 8/1977 | Saunders et al. |
| 4,045,955 | 9/1977 | Brannstrom et al. |
| 4,100,731 | 7/1978 | Janes et al. |
| 4,134,257 | 1/1979 | Riple |
| 4,171,613 | 10/1979 | Schmidt-Roedenbeck et al. |
| 4,188,781 | 2/1980 | Johnson et al. |

OTHER PUBLICATIONS

"SD Series" Controls for Aero-Engines-D. A. Caine--Nov. 1975.
Digital Control for Helicopter Powerplants-D. A. Caine & S. Janik-Nov. 1979.
NDEC-A Control Concept for Helicopter Gas Turbines-D. J. Hawes & R. M. Evans-May 1980.

Primary Examiner—Louis J. Casaregola
Attorney, Agent, or Firm—William A. Marvin; Anthony F. Cuoco

[57] ABSTRACT

An acceleration limit reset circuit (38, 40, 42, 44) is disclosed for a closed loop fuel control (11) of a gas turbine engine (10). The closed loop control includes a comparator circuit (28) which compares an acceleration term Ngs-Nd to a limit value Al and if the scheduled acceleration (Ngs-Nd) is in excess of the limit, regulates the rate of change of the engine speed to the limited value Al. The acceleration limit Al is scheduled by an accel/decel limiter circuit (30) as substantially equivalent to the surge line of the engine. The acceleration limit reset circuit (38, 40, 42, 44) is provided for modifying the acceleration limit Al during special operating conditions of the engine (10) by a signal RRS.

3 Claims, 4 Drawing Figures

ACCELERATION LIMIT RESET

BACKGROUND OF THE INVENTION

The invention relates generally to an acceleration limit reset for fuel controls of gas turbine engines having acceleration limiters. The invention is more directly pertinent to the reset of the acceleration limit for transient conditions including a "reslam" condition.

The closed loop fuel control of gas turbine engines based on acceleration has become successfully implemented in various systems. These systems act directly to control the rate of change of the engine speed as a function of an acceleration term. The acceleration term is formed by differencing a scheduled term with an actual or an implied actual parameter of the gas generator. The actual acceleration of the engine is fed back through changes in the actual term for comparison with the scheduled term. The acceleration term, which after an integration effectively provides a datum for a proportional speed control loop, may therefore, be a function of any of a number of control input parameters including engine speed, ambient pressure, temperature, compressor pressure, etc. Advantages of this form of acceleration control include consistent predictable accelerations independent of fuel type, temperature, and altitude. The acceleration time is also generally independent of air bleed and power extraction status.

A closed loop fuel control for a gas turbine engine based on acceleration is more fully disclosed in U.S. application Ser. 210,938, filed in the name of Roland Marston Evans on Nov. 28, 1980, which is commonly assigned with the present application. The disclosure of Evans is hereby expressly incorporated by reference herein. Other examples of closed loop systems of this type are illustrated in U.S. Pat. Nos. 4,018,044; 4,100,731; and 4,040,250.

Because the error or acceleration term may exceed the surge capability of the engine, it is conventional in a closed loop control to limit the acceleration term according to an acceleration schedule which defines the surge line of the engine in terms of at least one engine operating parameter. Thus, if a scheduled acceleration term exceeds this limit function at a particular system operating point, the control will regulate the fuel flow accordingly and cause the engine to accelerate at the lower limit value. In many controls, the acceleration schedule is variable with respect to one or several operating parameters of the engine in order to provide an adequate stall margin while maintaining the maximum acceleration limit available over various operating conditions.

There are however, certain special transient conditions where the steady state stall margin is considerably reduced and the acceleration limit should be additionally modified or reset while these conditions exist. Since it is desirable to operate as close to the steady state surge line of the engine as possible it is not advantageous to schedule for these conditions in the normal manner. If a transient margin is included in the normal schedule, then the engine will not be able to accelerate to the full extent available in steady state conditions.

One of the most critical of these special conditions is what is termed a "reslam" operation. The condition is initiated when the engine has been in a steady state condition at a power level near maximum for a substantial period of time. The engine is very hot and therefore, fuel is very efficiently used. If, during this time, the power demand lever is retarded rapidly to idle or a reduced power position but then pushed back to a maximum level before the engine has been allowed to reach a thermal equilibrium, a reslam condition occurs. The reslam condition may produce a reduction in the stall margin of the engine whereby the overfueling capacity or surge margin may be 50% less than during a normal acceleration. It is therefore, imperative that the fuel control not excessively overfuel during this condition.

The reduction of stall margin during a "reslam" condition is due primarily to the thermal inertia of the temperature sensitive components in the engine such as air seals, compressor blades, and the like. Therefore, the stall margin is reduced at the moment of deceleration and the amount of reduction is a function of the difference in power levels. The steady state stall margin will be restored over time as the engine regains thermal equilibrium at its new operating point. If, however, an acceleration is demanded prior to the engine reaching thermal equilibrium, a reset of the acceleration limit should be implemented to prevent stall.

A "reslam" condition is even more critical in a two-spool gas turbine engine where a high pressure compressor spool and a low compressor spool are used in combination. During an extremely rapid deceleration which generally initiates a "reslam" condition, the normal relationship between the speeds of the high pressure compressor spool and low pressure compressor spool can be lost. The compressors have different inertias and if not decelerated at substantially the same rate lose their synchronous relationship because of the difference. The speed difference will cause the low pressure compressor to overboost the high pressure compressor to create a mismatch. If this occurs and a "reslam" acceleration is requested the engine may stall since the surge margin is drastically reduced during the mismatch. The engine must, therefore, be accelerated at a different rate than the steady state acceleration limit until the steady state relationship is regained to prevent stall.

SUMMARY OF THE INVENTION

In accordance with its objects and advantages, the invention includes an acceleration/deceleration limiter circuit which schedules an acceleration limit for a closed loop fuel control of a gas turbine engine. The closed loop control comprises a comparator circuit which compares an acceleration term to the limit value and if the scheduled acceleration is in excess of the limit, regulates the rate of change of the engine speed to the limited value. The acceleration limit is scheduled as substantially equivalent to the surge line of the engine. An acceleration limit reset circuit is provided for modifying the acceleration limit during special operating conditions of the engine.

In one preferred embodiment, for a single or multi-spool spool engine, a thermal reset circuit is provided. The thermal reset circuit includes a deceleration sensor which senses the amount of a scheduled deceleration and generates a deceleration signal to a compensation circuit. The compensation circuit multiplies the deceleration signal by a gain term and generates a reslam reset signal therefrom. The reslam reset signal is then subtracted in a summing junction from the acceleration limit generated by the acceleration/deceleration limiter circuit.

In this manner the amount that the steady state acceleration limit is reset downward is proportional to the amount of the deceleration measured. Additionally, the reslam reset signal decays with a time constant related to the thermal recovery time of the engine. The control technique therefore, allows the acceleration limit to be set downward by an amount equivalent to the amount that the surge margin is reduced during a transient and then be restored at substantially the same rate as the engine recovers equilibrium.

In another embodiment the deceleration sensor includes a means for differencing the demanded speed (datum) of the system and the actual speed. For changes in the scheduled speed this method produces a delay to the sensing of a scheduled deceleration. The engine, therefore, has the opportunity to actually decelerate to the scheduled speed and produce an actual reslam condition. A false indication of surge margin reduction due to the reslam condition, where a large deceleration is scheduled but the engine actually does not decelerate to that operating point before the power demand lever requests another acceleration, is thereby avoided.

In still another embodiment, useful for two-spool gas turbine engines, the acceleration limit from the acceleration/deceleration circuit is multiplied by either a unity gain term or a fractional term less than unity. The multiplication and generation of the terms is accomplished by a spool speed reset circuit. The spool speed reset circuit receives as inputs a speed signal from the high pressure compressor spool and a speed signal from the low pressure compressor spool. The circuit then compares these speeds to a function which defines the relationship of the spool speeds during matched or normal steady state operation. If the spool speeds are mismatched and the low spool speed is greater than that correct for the high spool speed, then the fractional term is generated to reduce the acceleration limit. Thus, during mismatched operation the low pressure compressor will not cause the high pressure compressor to stall if a slam acceleration is requested. This reduction in stall margin is maintained by the spool speed circuit until the speeds are rematched or until at least the high pressure compressor is rotating faster than the normal speed corresponding to the low pressure compressor speed.

Another embodiment of the invention compares the output of the thermal reset circuit and the spool speed reset circuit in a "low wins" gate and selects the lower acceleration limit between the two. The selected acceleration limit then is used in the acceleration/deceleration limiter circuit to control the rate of change in engine speed. In this manner a two-spool gas turbine engine can be limited during a mismatched condition in one instance or during thermal surge margin reduction in the other.

Therefore, to alleviate the above-noted stall conditions and to more advantageously control a gas turbine engine, it is the object of the invention to provide an acceleration limit reset circuit which modifies the acceleration limit of a gas turbine engine fuel control during transient conditions.

It is another object of the invention to provide a thermal acceleration limit reset until the engine has reached thermal equilibrium during "reslam" conditions.

Still another object of the invention is to provide a spool speed acceleration limit reset during mismatched operation of the high pressure compressor spool and low pressure compressor spool of a two-spool gas turbine engine.

Additionally, it is an object of the invention to provide a circuit that resets the acceleration limit during reslam conditions to the lower of a thermal acceleration limit reset and a spool speed acceleration limit reset for a two-spool gas turbine engine.

A major advantage of these special condition reset circuits, either alone or in combination, is to allow the acceleration limit schedule to operate the closed loop control closer to the steady state surge line without stall during these critical conditions.

These and other objects, features, and aspects of the invention will be more fully understood and clearly described if a reading of the detailed description is undertaken in conjunction with the appended drawings wherein:

DETAILED DESCRIPTION OF THE PREFERRED EMBODIMENTS

Figure 1:
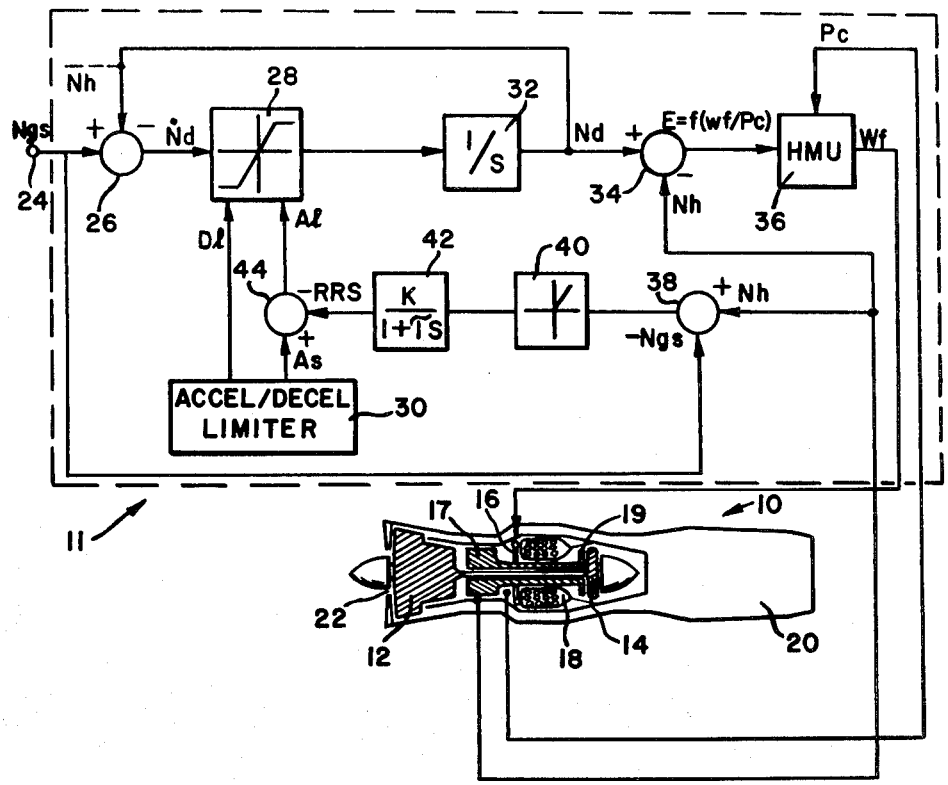
FIG. 1 is a system block diagrammatic view of a fuel control system for a gas turbine engine incorporating a thermal acceleration limit reset circuit constructed in accordance with the invention.

With reference to FIG. 1 there is shown a fuel control system 11 for a turbojet engine which is generally designated 10. The engine 10 includes an intake duct 22 through which air enters. After entering the engine, the air is compressed by a low pressure compressor 12 and subsequently by a high pressure compressor 17. Compressors 12 and 17 are of the axial type which produce an increase in pressure and consequently, an increase in the density of the incoming air as a function of their speed. The denser air moves to a fuel supply section where a fuel ring 16 produces a combustible fuel/air mixture by spraying fuel into the incoming stream. The fuel/air mixture is thereafter ignited and combusted in burners 18 to produce a high velocity exhaust gas. The exhaust gas, as is conventional in this type of reaction engine, exits through a nozzle 20 to produce a forward thrust. A portion of the energy contained in the exhaust gas is expended in rotating a low pressure turbine 14 and a high pressure turbine 19 which are physically attached to the respective compressors by concentrically disposed rotor shafts. Each compressor and turbine combination form a spool which rotates independently from the other. The engine described is a conventional two-spool turbojet engine in which the second or low pressure spool has been added to increase the efficiency of the engine.

Generally, the control of the engine speed and thus output power or thrust of the engine is regulated by the amount of fuel flowing through the fuel ring 16. This fuel flow, Wf, is modulated by the fuel control 11 to provide more or less energy and thus reaction power from the engine. Increasing the fuel flow increases the engine speed and output power while decreasing the fuel flow decreases engine speed and output power.

The fuel control system 11 is provided for assuring that control of the engine speed is maintained during steady state operation, accelerations, and decelerations. The fuel control illustrated is based on an input to terminal 24 which is the desired or scheduled rotational speed Ngs, of one of the compressor and turbine combinations of the engine 10. The signal Ngs can, for example, be generated as the output from a schedule based on the power lever angle of the particular device the engine is used on. In its simplest form the Ngs signal can be generated from a potentiometer that is ganged to the power lever.

When referring to the engine speed, either the high pressure compressor speed (high spool speed Nh) or the low pressure compressor speed (low spool speed Nl) is meant because either can be used to control the engine. In this particular embodiment the controlling parameter of the fuel control will be the high spool speed Nh. The high spool speed is the controlling parameter in this type of engine since it is the more critical to the operation.

By scheduling the commanded speed Ngs to terminal 24 any desired engine power may be obtained since the fuel control varies the power of the gas turbine engine by regulating engine speed. Thus, the control system operates to govern the engine speed as a function of the scheduled speed Ngs and accelerates or decelerates the engine in a manner to reach a new scheduled speed when the pilot or another system component changes the scheduled engine speed. Otherwise, for changes in engine environment such as altitude, temperature, pressure or other factors, the governor acts to maintain the scheduled speed Ngs.

To control accelerations or decelerations, the control system forms a demanded acceleration term which is derived from the difference of the scheduled speed Ngs and a demanded speed term Nd. Alternatively, the acceleration term can be derived from the difference between the high spool speed signal Nh and the scheduled speed signal Ngs. The advantages of forming the acceleration term as a function of the demanded signal are set forth in the referenced Evans application. This function is preformed by feeding the two chosen parameters to a first summing junction 26 and generating a difference signal of sign and magnitude equivalent to the difference therebetween. The acceleration term or difference signal is integrated in an integrator 32 to become the demanded speed signal Nd. This portion of the control forms an integral loop providing a datum which is the demanded speed signal Nd.

The acceleration term is conventionally limited by a comparator circuit 28. The comparator 28 compares the acceleration term to an upper limit Al and a lower limit Dl and passes the acceleration term unmodified if between the two values. However, if the demanded acceleration is great enough, the acceleration term will be limited at the upper acceleration limit Al, while if the demanded deceleration is sufficient, it will be limited at the lower deceleration limit Dl. An acceleration/deceleration limiter circuit 30 is used to generate the variable limits and to modify the limits as a function of the operating parameters of the engine as is conventional in the art. An acceleration limit schedule is stored in a memory device of the circuit where the schedule is substantially equivalent to the steady state surge line of the particular engine expressed as a function of the engine operating parameters chosen. The surge line can be expressed as any of a number of different parameters indicating steady state values of fuel/air ratio.

An advantageous acceleration/deceleration limiter circuit which can be used in the illustrated gas turbine fuel control system is more fully described in a co-pending application Ser. No. 217,374, filed in the name of David J. Hawes on Dec. 17, 1980, which is commonly assigned. The disclosure of Hawes is hereby expressly included by reference herein.

Thereafter, the demanded speed signal Nd is differenced with the high spool speed of the turbine Ng in a second summing circuit 34. The error signal E generated by this difference is then used to proportionally control the fuel flow to the engine 10 in a direction tending to null the error between the scheduled speed signal Ngs and the demanded speed signal Nd. In this manner this portion of the controller forms a proportional control loop slaved to the datum Nd. For changes in the datum Nd the actual engine speed Ng will change to where there is a steady state error E supporting that particular demanded speed.

The proportional control is developed by a hydromechanical unit (HMU) 36 which receives as an input the error signal E. The HMU 36 multiplies the error signal E by a predetermined gain to provide a fuel flow Wf which is proportional to the error signal. In its simplest form, if the error signal E is electrical, the HMU could be implemented as a proportional solenoid valve which changes position with respect to a control voltage representative of the error signal to regulate fuel flow from a pressurized fuel source. The HMU 36 would, therefore, also consist of a pressure regulator and a pressurized source of fuel (not shown) as is conventionally known in the art.

Additionally, the HMU 36 can include means for mechanically multiplying the error signal E by an input representative of the output of the compressor stages, compressor pressure Pc. In combination with the proportional solenoid, the multiplying means could comprise a multiplying piston coupled to the fuel valve which tranduces the compressor pressure Pc into a force to assist the solenoid. Thus, the error signal E at all engine operating points is proportional to Wf/Pc or the fuel/air ratio of the engine. Because of this mechanical multiplication, the error signal E can be thought of as being generated as a function of the fuel/air ratio of the engine. Normally, this would make the scheduling of the speed signal Ngs much easier to implement.

The control further includes a first embodiment of an acceleration limit reset circuit comprising a summation circuit 38, a polarity detector 40, a compensation circuit 42, and a second summation circuit 44. The circuit is termed a thermal reset circuit because it modifies the acceleration limit of the engine to compensate for loss of surge margin due to thermal inertia. The acceleration limit reset circuit detects a deceleration of the engine and outputs a reslam reset signal RRS to the summation circuit 44 which is proportional to that deceleration. The reslam reset signal is subtracted from a scheduled acceleration As by the summation junction 44 to yield the final acceleration limit Al. The reslam reset signal RRS then decays with a time constant related to the thermal recovery time of the engine.

The deceleration of the engine is detected by the combination of the first summation circuit 38 and the polarity detector 40. The first summation circuit 38 subtracts the scheduled speed Ngs from the actual high spool speed signal Nh to produce an output that is fed to the polarity detector 40. The polarity detector 40 will only transmit those differences from the summation circuit from the first quadrant where the result is positive. At those times, the actual speed is greater than the scheduled speed, thereby indicating that there is a deceleration scheduled. The polarity detector may, in the simplest implementation, be a diode.

Once a deceleration has been detected, the deceleration signal is fed to the compensation circuit 42 where it is multiplied by a proportionality factor K from the numerator of the transfer function of the compensation circuit. The proportionality factor K is scaled to permit the amount of acceleration limit reset to be proportional to the amount of deceleration detected. The factor in the denominator of the transfer function, $(1+(\tau)S)$, where $(\tau)$ is a time constant and S is the Laplace operator in the frequency domain, provides a decay to the reslam reset signal RRS. The time constant $(\tau)$ is designated to be indicative of the thermal inertia of the particular engine that the control is used on.

Figure 5:
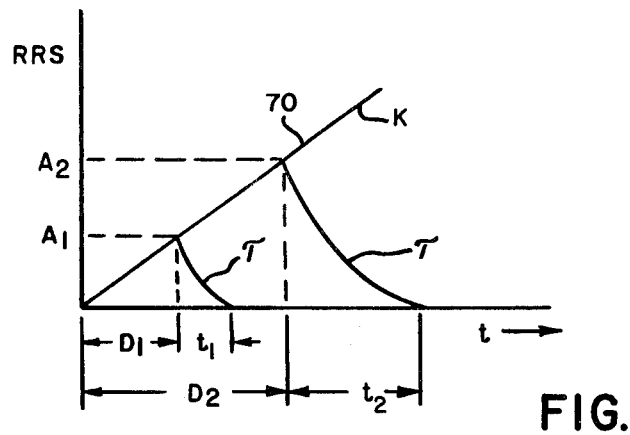
FIG. 5 is a graphic representation of the reslam reset signal amplitude as a function of time and various decelerations.

FIG. 5 is a graphical representation of the reslam reset signal RRS illustrated as a function of time and also as a function of the deceleration of the engine. The proportional generation of the signal RRS is developed by the linear straight line curve 70 with a slope equivalent to the gain K. In the illustrated embodiment, the curve 70 passes through the origin but could, if desired, be offset therefrom to not produce an acceleration limit reset until a minimum deceleration was detected.

Alternatively, the simple proportionality constant, K, could be replaced with a function of greater complexity. For example, an empirical function describing the loss of surge margin for any deceleration could be derived for a particular engine or a group of engines. Thus, curve 70 generates an RRS signal of amplitude A1 for a deceleration D1 which is equivalent to D1 multiplied by K. Similarily, a larger deceleration D2 will produce a larger RRS signal of amplitude A2 equivalent to D2(K).

Amplitudes A1, A2 of the RRS signal both decay, exponentially with the same time constant $(\tau)$ but because A2 is greater than A1, the decay time T2 is greater than T1. Using the proportionality factor K in combination with a predetermined time constant allows the acceleration limit to recover in a manner similar to that of the physical thermal recovery of the engine. In other words, for greater decelerations, a longer time period is provided for the engine to regain its thermal equilibrium before it is allowed to accelerate at the steady state acceleration limit. The exponential decay of the RRS signal models the physical recovery of the thermal equilibrium by the engine relatively closely.

Figure 2:
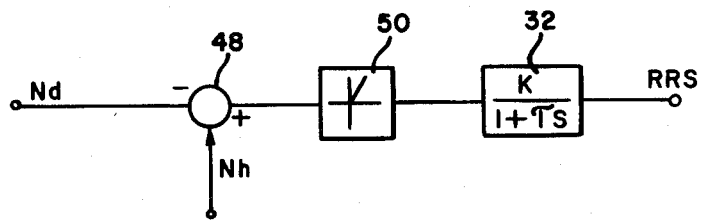
FIG. 2 is a detailed schematic block diagram of a second implementation of the thermal acceleration limit reset circuit illustrated in FIG. 1 including means for delaying a scheduled deceleration.

Another embodiment of an acceleration limit reset circuit for reslam conditions is illustrated in FIG. 2. As was previously described for the thermal reset circuit illustrated in FIG. 1, the second implementation includes a summing junction 48, a polartiy detector 50, and a compensation circuit 52. These components are identical to those components described for the previous implementation and function in the same manner. However, instead of the scheduled speed signal Ngs being differenced with the high spool speed Nh to generate a deceleration signal, the demanded speed signal Nd is used for an input to summation circuit 48. This implementation will prevent a false requirement for a surge margin reduction when the power lever angle has been set to schedule a lower speed but is reslammed before the engine actually decelerates to that value. In such a case the overfueling margin has not been reduced to the extent detected and thus the acceleration limit should not be reset proportionally to the difference between the scheduled and actual speeds.

Figure 3:
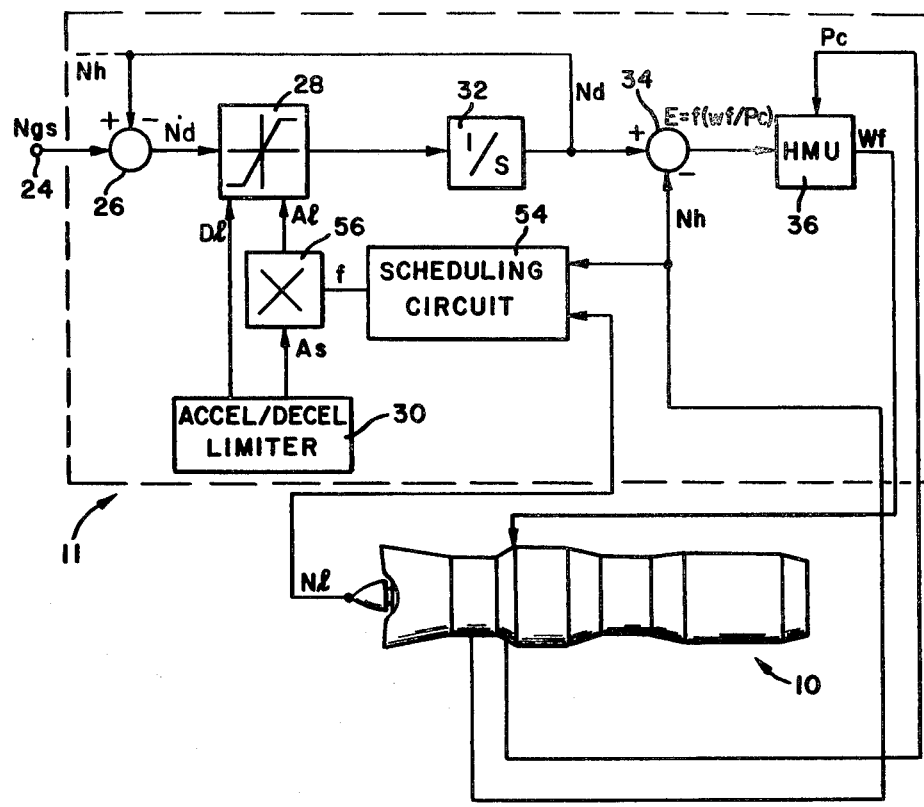
FIG. 3 is a system block diagrammatic view of a fuel control system for a gas turbine engine including a spool speed acceleration limit reset circuit constructed in accordance with the invention.

FIG. 3 illustrates another embodiment of an acceleration limit reset circuit for reslam conditions that is specifically advantageous for use with a two-spool gas turbine engine. The circuit is termed a spool speed reset circuit because it modifies the acceleration limit to compensate for mismatched spool action. The fuel control system with which the spool speed reset circuit can be used is identical with that described in FIG. 1. Therefore, for clarity and ease of understanding, the original numbers for the components thereof have been retained. The turbojet engine has been shown in block outline only. For the description and the operation of these components and of the fuel control system, reference is made to the previous exposition.

Figure 6:
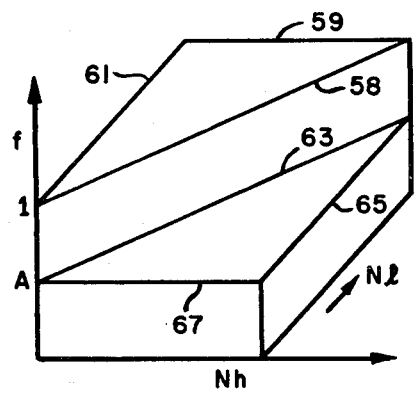
FIG. 6 is a graphical representation of the multiplication factor f as a function of the high and low spool speed signals for the system illustrated in FIG. 3.

The embodiment of the spool speed reset circuit of FIG. 3 comprises a scheduling circuit 54 and a multiplier 56. The scheduling circuit 54 receives as inputs the high spool speed Nh and the low spool speed Nl. The scheduling circuit includes a memory which stores values of a multiplication factor f. The schedule stored in circuit 54 is illustrated in FIG. 6 and shows values of the factor for all combinations of spool speeds. In one section of the schedule, the spool speeds are scheduled as a functional representation which describes the preferred relationship of the spools when in synchronous or matched operation. In the illustration the straight line 58 indicates when there is a matched relationship between the speeds of the high and low pressure spools. While preferred, the relationship of the spool speeds for different engines may be different than one-to-one and the curve 58 is provided merely to indicate that a matched relationship which can be described graphically does occur.

Thus, if the spool speeds are matched along line 58 or at least not asynchronously operating where they will reduce the stall margin of the engine (high spool speed greater than low spool speed), then the scheduling circuit 54 outputs a factor f which is unity. This is indicated as the surface formed by the intersections of the lines 58, 59, and 61. However, if the spool speeds are mismatched, as would occur just after a rapid deceleration, then the scheduling circuit 54 outputs a gain factor f which is a fraction. The fraction A is related to the percentage that the steady state stall margin is reduced when the two spool speeds are mismatched. This region is the surface bounded by the intersection of lines 63, 65, and 67. While only a dual value schedule is shown in FIG. 6, it is evident that an empirical multivalue schedule for f can be used based on the spool speed relationship. Particularly, during mismatched operation instead of one value the scheduled factor can be proportional to the degree or amount of mismatch.

The gain factor f is then input to the multiplier circuit 56 which receives as its other input the scheduled acceleration limit As. Depending on which factor is input to the multiplier circuit, the acceleration limit is either unmodified by the unity factor or lowered by the fractional multiplication. In this manner, when a two-spool engine is mismatched, a reduction in the acceleration limit can be accomplished and the engine may still be accelerated without danger of surge or stall.

Figure 4:
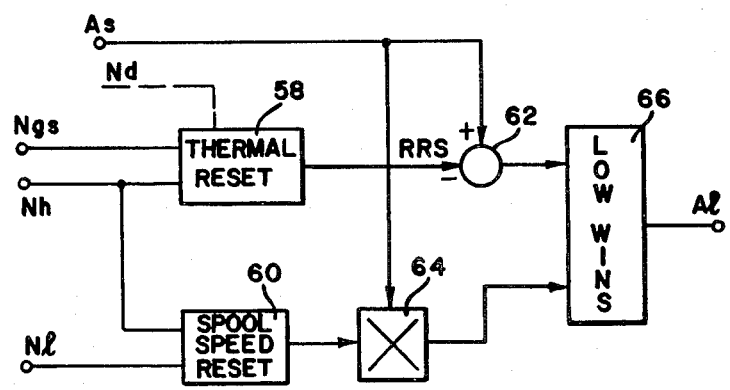
FIG. 4 is a detailed schematic block diagram of an acceleration limit reset circuit including a thermal reset circuit as illustrated in either FIGS. 1 or 2 and a spool speed reset circuit as illustrated in FIG. 3.

If attention will now be directed to FIG. 4, another embodiment of an acceleration limit reset circuit will be more fully described. The acceleration limit reset circuit shown in FIG. 4 is a combination of the thermal reset circuit illustrated in FIG. 1 and the spool speed reset circuit illustrated in FIG. 3. The circuit receives as an initial input the scheduled acceleration limit As from the acceleration/deceleration limiter circuit and outputs an acceleration limit Al to a comparator circuit, such as 28, described for the closed loop fuel control systems illustrated in the previous FIGS. 1 and 3.

A thermal reset circuit, illustrated as block 58, receives the scheduled speed signal Ngs or the demanded speed signal Nd and the high spool speed signal Nh to measure the deceleration and thereafter outputs the reslam reset signal RRS to a summation junction 62. The acceleration limit output from the summing junction 62 is identically generated to that derived from the thermal reset circuit illustrated in FIG. 1.

A spool speed reset circuit, illustrated as block 60, receives the high and low spool speeds, Nl, Nh, respectively, and outputs a gain factor f to the multiplier 64. The multiplier 64 receives as its other input the scheduled acceleration limit As and output an acceleration limit which is the product of the two factors. The operation of this circuit is identical to that disclosed for the spool speed reset circuit in FIG. 3.

Both of the acceleration limits from these circuits are input to a "low wins" gate 66. Depending on which circuit has developed the lower reset value for the acceleration limit, the low wins gate 66 selects that value and outputs it as the acceleration limit Al to the comparator circuit 28.

This implementation is particularly advantageous in the two-spool gas turbine engine wherein the spool speed reset circuit can be designed to provide a greater reset value when the spool speeds are mismatched and thereafter still provide a smaller thermal reset value. This operation would be particularly advantageous during a reslam condition when the spool speeds return to a matched condition prior to the restoration of the thermal equilibrium of the engine. The combination of the two circuits would thus permit a maximum acceleration of the engine during these special conditions without the danger of surging.

While a detailed description of the preferred embodiments and implementations has been disclosed, it will be obvious to those skilled in the art that various modifications and changes may be made thereto without departing from the spirit and scope of the invention as hereinafter defined in the appended claims. Specifically, although the thermal acceleration limit reset was described with respect to a single spool engine, it is obvious that it is equally applicable to multi-spool engines either alone or in combination with the spool speed acceleration limit reset. Additionally, all embodiments have been illustrated in connection with the operation of a turbojet engine. The invention is advantageously used with any gas turbine engine including those of the free turbine (shaft turbine) type.

What is claimed is:

1. An acceleration limit reset means for a fuel control of a two-spool gas turbine engine during mismatched spool speeds including means for generating an acceleration limit, said reset means characterized by:
    means for generating a high spool speed signal proportional to the actual speed of the high pressure compressor;
    means for generating a low spool speed signal proportional to the actual speed of the low pressure compressor;
    means, receiving said high and low spool speed signals, for generating a multiplication factor as a function of said high and low spool speed signals; and
    means for multiplying said acceleration limit by said factor.

2. A spool speed acceleration limit reset as defined in claim 1 wherein said multiplication factor generating means includes:
    means for generating a function defining a matched relationship for the high spool speed and the low spool speed;
    means for generating said multiplication factor as a unity term if matched operation is occurring; and
    means for generating said multiplication factor as a fractional term if matched operation is not occurring.

3. A fuel control for a gas turbine engine including a proportional speed loop and an integral loop, wherein said proportional speed loop is slaved to a datum formed by integrating an acceleration term in the integral loop; the fuel control further including means for limiting the acceleration term to a scheduled value substantially equivalent to the steady state surge line of the engine; the fuel control characterized by an acceleration limit reset means comprising:
    modifying means, receiving the scheduled value of the acceleration limit, for modifying the scheduled value during transient conditions, and for generating the acceleration limit of the fuel control as the modified schedule value, wherein said modifying means varies the scheduled acceleration limit as a function of the high spool speed and low spool speed of the engine.

* * * * *